2,752,347
Patented June 26, 1956

2,752,347

DIAMINOADIPONITRILES

Newman M. Bortnick, Oreland, and Marian F. Fegley, Mont Clare, Pa., assignors to Rohm & Haas Company, Philadelphia, Pa., a corporation of Delaware No Drawing. Application October 23, 1952,
Serial No. 316,557

11 Claims. (Cl. 260—247.5)

This invention relates to diaminoadiponitriles of the formula

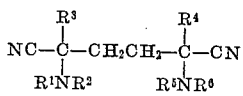

wherein $R^1$, $R^2$, $R^5$, and $R^6$ taken individually represent hydrocarbon groups, including alkyl, alkenyl, cycloalkyl, aralkyl, and aryl groups; $R^1$ and $R^2$ when taken together represent a divalent chain which forms a heterocycle with the nitrogen; $R^5$ and $R^6$ when taken together may likewise represent a divalent chain forming a heterocycle with the nitrogen, and $R^3$ and $R^4$ represent hydrogen or hydrocarbon groups, including alkyl, cycloalkyl, aralkyl, aryl, and alkenyl groups.

These compounds are prepared by reacting by addition hydrogen cyanide and 1,4-diamino-1,3-butadienes. This reaction takes place between about 0° and about 100° C., preferably in the presence of an inert organic solvent, such as ethyl ether, isopropyl ether, butyl ether, dioxane, naphtha, benzene, toluene, or the like. The reaction may be effected under pressure or at normal pressures. Usually the best yields are obtained by adding a diaminobutadiene to a solution of hydrogen cyanide in an organic solvent. The product is often collected in a crystalline form or may be purified by crystallization.

As diaminobutadienes, there may be used any compound of the formula

wherein the various R substituents have the same significance as in the previous formula. These compounds are available through isomerization of diaminobutynes of the formula

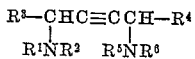

A convenient method for effecting the isomerization of these diaminobutynes is described in our application Serial No. 316,558, filed on even date. The process of isomerizing said butynes comprises treating a said butyne with an alkali metal catalyst at a temperature between 0° and 50° C. This reaction is desirably carried out in the presence of an inert organic solvent, such as naphtha, benzene, toluene, xylene, dioxane, and the like. The desired diaminobutadiene is usually purified by distillation under reduced pressure.

The active catalysts for isomerization include sodium or lithium metal in finely divided form, especially in the form of a dispersion in an inert solvent, and sodium hydrocarbons, such as sodium alkyls or sodium aryls, and the like. Amyl sodium, cyclohexyl sodium, benzyl sodium, phenyl sodium, furyl sodium, and similar sodium hydrocarbons and sodium compounds having sodium attached to carbon promote the conversion of diamino-2-butynes to diamino-1,3-butadienes.

The substituents in the above compounds may be of the widest variety. $R^1$, $R^2$, $R^5$, and $R^6$ may be alkyl, alkenyl, aralkyl, aryl, or cycloalkyl when taken individually. When taken in pairs, $R^1$ and $R^2$ or $R^5$ and $R^6$, they make up divalent chains which form heterocycles with the nitrogen as in morpholino-, thiamorpholino-, pyrrolidino-, or piperidino- groups. It should be pointed out that these R groups need not be the same. They may take such forms as methyl, ethyl, propyl, isopropyl, butyl, amyl, hexyl, octyl, nonyl, decyl, dodecyl, allyl, methallyl, crotyl, undecenyl, phenyl, alkylphenyl, benzyl, alkylbenzyl, cyclohexyl, cyclopentyl, and so on. It is preferred that the carbon atoms in $R^1$ and $R^2$ or $R^5$ and $R^6$ do not exceed about 18.

The substituents $R^3$ and $R^4$ are derived from the aldehydes used for preparing the original diamino-2-butyne, which are conveniently made by Reppe's procedure from secondary amines, aldehydes, and acetylene. When formaldehyde is the aldehyde used, $R^3$ and $R^4$ are hydrogen. Otherwise they are hydrocarbon groups or the equivalent, including alkyl, alkenyl, cycloalkyl, aralkyl, and aryl groups. Specific groups are methyl, ethyl, propyl, butyl, octyl, 3-methyl-3-butenyl, undecyl, phenyl, benzyl, phenylethyl, and so on. It is preferred that they do not contain over eleven carbon atoms each.

Typical 1,4-diamino-1,3-butadienes include the following: 1,4-bis(dimethylamino)-1,3-butadiene, 1,4-bis(diethylamino)-1,3-butadiene, 1,4-bis(di-n-butylamino)-1,3-butadiene, 1,4 - bis(N - methyl - N - octylamino) - 1,3-butadiene, 1,4 - bis(N - methyl - N - dodecylamino)-1,3-butadiene, 1-4-dimorpholino-1,3-butadiene, 1,4-dipiperidino - 1,3 - butadiene, 1,4 - dipyrrolidino - 1,3-butadiene, 1 - dimethylamino - 4 - morpholino - 1,3-butadiene, 1 - diethylamino - 4 - pyrrolidino - 1,3 - butadiene, 1 - dimethylamino - 4 - piperidino - 1,3 - butadiene, 1,4 - bis(diallylamino) - 1,3 - butadiene, 1,4-bis(N - methyl - N - phenylamino) - 1,3 - butadiene, 1,4 - bis(dicyclohexylamino) - 1,3 - butadiene, 1 - methyl-1 - morpholino - 4 - dimethylamino - 1,3 - butadiene, 1,4 - diisopropyl - 1,4 - bis(dimethylamino) - 1,3 - butadiene, 1 - phenyl - 1 - morpholino - 4 - dimethylamino-1,3 - butadiene, 1,4 - diphenyl - 1,4 - bis(dimethylamino)-1,3 - butadiene, 1,4 - bis(dimethylamino) - 1,4 - bis-(2,4,4 - trimethylpentyl) - 1,3 - butadiene, 1,4 - bis(diethylamino) - 1,4 - diisopropyl - 1,3 - butadiene, etc.

Typical preparations of diaminoadiponitriles are described in the following illustrative examples in which parts are by weight.

Example 1

A reaction vessel equipped with stirrer, condenser, and dropping funnel was cooled in an ice bath and charged with 50 parts of hydrogen cyanide and 43 parts of diisopropyl ether. While this charge was stirred and maintained below 10° C., there was slowly added 1,4-bis(dimethylamino)-1,3-butadiene in a total of 91 parts. The mixture was stirred for two hours with the temperature thereof allowed to rise to 30° C. Crystals formed. They were filtered off. Additional crystals were obtained on cooling the filtrate. The total yield of product was 122.6 parts, a 97.3% yield. This product was recrystallized from petroleum ether. It melted at 87°–87.5° C., contained 28.3% of nitrogen, and corresponded in composition to $(CH_3)_2NCH(CN)CH_2CH_2CH(CN)N(CH_3)_2$, 2,5-bis(dimethylamino)adiponitrile.

This compound is an effective toxicant in insecticidal compositions, being particularly effective in fly sprays.

The above product was treated with two equivalents of water in an excess of sulfuric acid and the mixture was held at 50°–70° C. for two hours. From this reaction mixture there was separated 2,5-bis(dimethylamino) adipamide in a yield of 90%. This diamide melts at 184°–185° C. By analysis it contains 24.3% of nitrogen (theory 24.3%).

This diamide was heated with ethanol and sulfuric acid to form diethyl 2,5-bis(dimethylamino)adipate, which was distilled at 145° C./1.5 mm. There was likewise formed the dimethyl ester, which distilled at 130° C./2.2 mm.

In place of the above 1,4-bis(dimethylamino)-1,3-butadiene there may be used other 1,4-bis(dialkylamino)-1,3-butadienes with entirely similar formation of 2,5-bis(dialkylamino)adiponitriles.

Example 2

A solution was made of 7.5 parts of 1,4-dimorpholino-1,3-butadiene in 83 parts of dioxane and thereto was added hydrogen cyanide in an amount of four parts. The mixture was stirred for two hours and left standing for two days. Crystals formed and were separated by filtration to give seven parts of 2,5-dimorpholinoadiponitrile. The product was recrystallized from dioxane and melted at 204°–205° C. It contained by analysis 10.04% of nitrogen (theory 10.06%).

Example 3

A reaction vessel equipped with stirrer, reflux condenser, and dropping funnel was charged with five parts of hydrogen cyanide and 23 parts of pentane. The vessel was cooled to 0°–5° C. and thereto 2,2,4,11,13,13-hexamethyl-6,9-bis(dimethylamino)-6,8-tetradecadiene was slowly added to a total of 27 parts. At first a three phase system was present, but the mixture became homogeneous as the reaction mixture was stirred and the reaction proceeded. The mixture was left standing for two days. A crystalline product separated and was filtered off. It melted at 123°–125° C. and contained 6.4% of nitrogen, corresponding in composition to 2,2,4,11,13,13-hexamethyl-6,9-bis(dimethylamino)-6,9-dicyanotetradecane. This compound may be represented in simplified structural form as $$\begin{array}{cc} C_8H_{17} & C_8H_{17} \\ | & | \\ NC-C-CH_2CH_2-C-CN \\ | & | \\ N(CH_3)_2 & N(CH_3)_2 \end{array}$$

the $C_8H_{17}$ groups here having the branched chain $$\begin{array}{c} CH_3 \\ | \\ -CH_2CHCH_2-C-CH_3 \\ | \quad\quad | \\ CH_3 \quad CH_3 \end{array}$$

From this compound there can be formed by alkaline hydrolysis the 6,9-diamido- derivative.

In the same way other 1,4-diamino-1,3-butadienes add hydrogen cyanide to form corresponding 1,4-dicyano-1,4-diaminobutanes which may also have hydrocarbon substituents in the 1,4-positions as above.

The reaction is not confined to symmetrical diaminobutadienes. There may be used, for example, the mixed amino compound shown in our above-mentioned application filed on even date. It is there shown that by first reacting morpholine, acetaldehyde, and acetylene to form 3-morpholino-1-butyne, and then reacting this compound with dimethylamine and formaldehyde in the presence of cuprous chloride, there is formed 4-morpholino-1-dimethylamino-2-pentyne. When this product was treated in naphtha or toluene solution with a sodium dispersion there was formed the isomeric 4-morpholino-1-dimethylamino-1,3-pentadiene.

This compound reacted with hydrogen cyanide as above yields the compound $$\begin{array}{c} CH_2CH_2 \quad\quad CN \quad\quad CN \\ O \diagdown \quad\quad | \quad\quad\quad | \\ \quad\quad N-C-CH_2CH_2-CHN(CH_3)_2 \\ \diagup \quad\quad | \\ CH_2CH_2 \quad CH_3 \end{array}$$

In the same way there is prepared 1-morpholino-1-phenyl-4-dimethylamino-1,3-butadiene and from this mixed diamino compound there is formed the dicyanide, $$\begin{array}{c} CH_2CH_2 \quad\quad CN \quad\quad CN \\ O \diagdown \quad\quad | \quad\quad\quad | \\ \quad\quad N-C-CH_2CH_2-CHN(CH_3)_2 \\ \diagup \quad\quad | \\ CH_2CH_2 \quad C_6H_5 \end{array}$$

Example 4

There were mixed 50 parts of a pentane solution containing four parts of hydrogen cyanide and a solution of eight parts of 1-dimethylamino-4-morpholino-1,3-pentadiene in pentane and ether. The mixture was held at 5°–10° C. for seven days. Two layers developed. Volatile material was stripped off under reduced pressure, the temperature being finally raised to 100° C. The residue corresponded closely in composition to 1-dimethylamino-4-morpholino-1,4-dicyanopentane. The purity of this product was 96%.

Example 5

To a solution of 10 parts of 1,4-dipyrrolidino-1,3-butadiene in ether there was added a solution of 4.5 parts of hydrogen cyanide in ether. The mixture was stirred and cooled in an ice bath for an hour. A solid precipitated and was separated by filtration. It melted at 118°–119.5° C. It was recrystallized from ether and then melted at 121°–122° C. and corresponded in composition to a compound of the formula $$\begin{array}{c} C_4H_8NCHCH_2CH_2CHNC_4H_8 \\ | \quad\quad\quad\quad\quad\quad\quad | \\ CN \quad\quad\quad\quad\quad\quad CN \end{array}$$

where $C_4H_8N-$ represents the pyrrolidino group.

The above compounds yield quaternary ammonium salts upon reaction with an alkylating agent, such as methyl iodide, benzyl chloride, ethyl bromide, or the like. For example, equimolar proportions of 2,5-bis(dimethylamino)adiponitrile and methyl iodide were mixed in toluene in the cold. An exothermic reaction ensued. The product was the mono quaternary ammonium iodide. Reaction of 21 parts of 2,5-bis(dimethylamino)adiponitrile in 51 parts of dimethylformamide and 45 parts of methyl iodide gave 53.5 parts of the bis quaternary iodide, $$[(CH_3)_3NCHCNCH_2CH_2CHCNN(CH_3)_3]\cdot^{++}2I^{--}$$

This quaternary iodide was dissolved in water to give a 10% solution and treated with silver hydroxide. Excess silver hydroxide and silver iodide were removed by filtration. This yielded the corresponding quaternary ammonium hydroxide, which was readily converted to any desired salt by reaction with any desired acid. These substances had bactericidal and fungicidal properties.

The diaminoadiponitriles of this invention are useful as corrosion inhibitors. They are also useful as chemical intermediates. As shown above, they yield amides, esters, salts, acids, and the like, through their nitrile groups and quaternary ammonium compounds through their amine groups.

We claim:

1. A process for preparing diaminoadiponitriles of the structure $$\begin{array}{cc} R^3 & R^4 \\ | & | \\ NC-C-CH_2CH_2-C-CN \\ | & | \\ R^1NR^2 & R^5NR^6 \end{array}$$

which comprises reacting by addition between about 0° and 100° C. hydrogen cyanide and a compound of the formula $$\begin{array}{cc} R^3-C=CHCH=C-R^4 \\ | \quad\quad\quad\quad\quad | \\ R^2NR^2 \quad\quad R^5NR^6 \end{array}$$

in the above formulas $R^1$, $R^2$, $R^5$, and $R^6$ when taken individually representing alkyl groups of not over four carbon atoms, $R^1$ and $R^2$ when taken together and $R^5$ and $R^6$ when taken together representing divalent chains from the class consisting of $-CH_2CH_2CH_2CH_2-$, $-CH_2CH_2CH_2CH_2CH_2-$, and $-CH_2CH_2OCH_2CH_2-$ which together with the nitrogen form a heterocyclic amino group, and R³ and R⁴ representing a member of the class consisting of hydrogen, phenyl, and alkyl groups of not over 11 carbon atoms.

2. A process for preparing diaminoadiponitriles of the structure

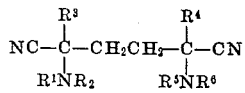

which comprises reacting together between 0° and 35° C. in the presence of an inert organic solvent hydrogen cyanide and a compound of the formula $$R^3-C=CHCH=C-R^4$$
$$\phantom{R^3-C=CH}|\phantom{CH=}|$$
$$\phantom{R^3-C=CHC}R^1NR^2\phantom{H=}R^5NR^6$$

in the above formulas R¹, R², R⁵, and R⁶ when taken individually representing alkyl groups of not over four carbon atoms, R¹ and R² when taken together and R⁵ and R⁶ when taken together representing divalent chains from the class consisting of —CH₂CH₂CH₂CH₂—, —CH₂CH₂CH₂CH₂CH₂—, and —CH₂CH₂OCH₂CH₂— which together with the nitrogen form a heterocyclic amino group, and R³ and R⁴ representing a member of the class consisting of hydrogen, phenyl, and alkyl groups of not over 11 carbon atoms.

3. A process for preparing 2,5-bis(dimethylamino) adiponitrile which comprises reacting together between 0° C. and about 35° C. in the presence of an inert organic solvent hydrogen cyanide and 1,4-bis(dimethylamino)-1,3-butadiene.

4. A process for preparing 2,5-dimorpholinoadiponitrile which comprises reacting together between 0° C. and about 35° C. in the presence of an inert organic solvent hydrogen cyanide and 1,4-dimorpholino-1,3-butadiene.

5. A process for preparing 2,2,4,11,13,13-hexamethyl-6,9 - bis(dimethylamino) - 6,9 - dicyanotetradecane which comprises reacting together between 0° and about 35° C. in the presence of an inert organic solvent hydrogen cyanide and 2,2,4,11,13,13-hexamethyl-6,9-bis(dimethylamino)-6,8-tetradecadine.

6. A process for preparing 4-morpholino-1-dimethylamino-1,4-dicyanopentane which comprises reacting together between 0° and about 35° C. in the presence of an inert organic solvent hydrogen cyanide and 4-morpholino-1-dimethylamino-1,3-pentadiene.

7. As new chemical compounds, substances of the formula

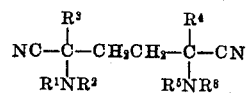

wherein R¹, R², R⁵, and R⁶ when taken individually represent alkyl groups of not over four carbon atoms, R¹ and R² when taken together and R⁵ and R⁶ when taken together represent divalent chains from the class consisting of —CH₂CH₂CH₂CH₂—, —CH₂CH₂CH₂CH₂CH₂—, and —CH₂CH₂OCH₂CH₂— which together with the nitrogen form a heterocyclic amino group, and R³ and R⁴ represent a member of the class consisting of hydrogen, phenyl and alkyl groups of not over 11 carbon atoms.

8. As a new chemical compound, 2,5-bis(dimethylamino)adiponitrile.

9. As a new chemical compound, 2,2,4,11,13,13-hexamethyl-6,9-bis(dimethylanino)-6,9-dicyanotetradecane.

10. As a new chemical compound, 2,5-dimorpholinoadiponitrile.

11. As a new chemical compound, 4-morpholino-1-dimethylamino-1,4-dicyanopentane.

References Cited in the file of this patent
UNITED STATES PATENTS

| | | |
|---|---|---|
| 2,527,510 | Allen et al. | Oct. 31, 1950 |
| 2,532,561 | Langkammerer | Dec. 5, 1950 |

OTHER REFERENCES

Piepenbrink: Annalen, vol. 572, pp. 83–95 (1915).